Patented Nov. 22, 1932

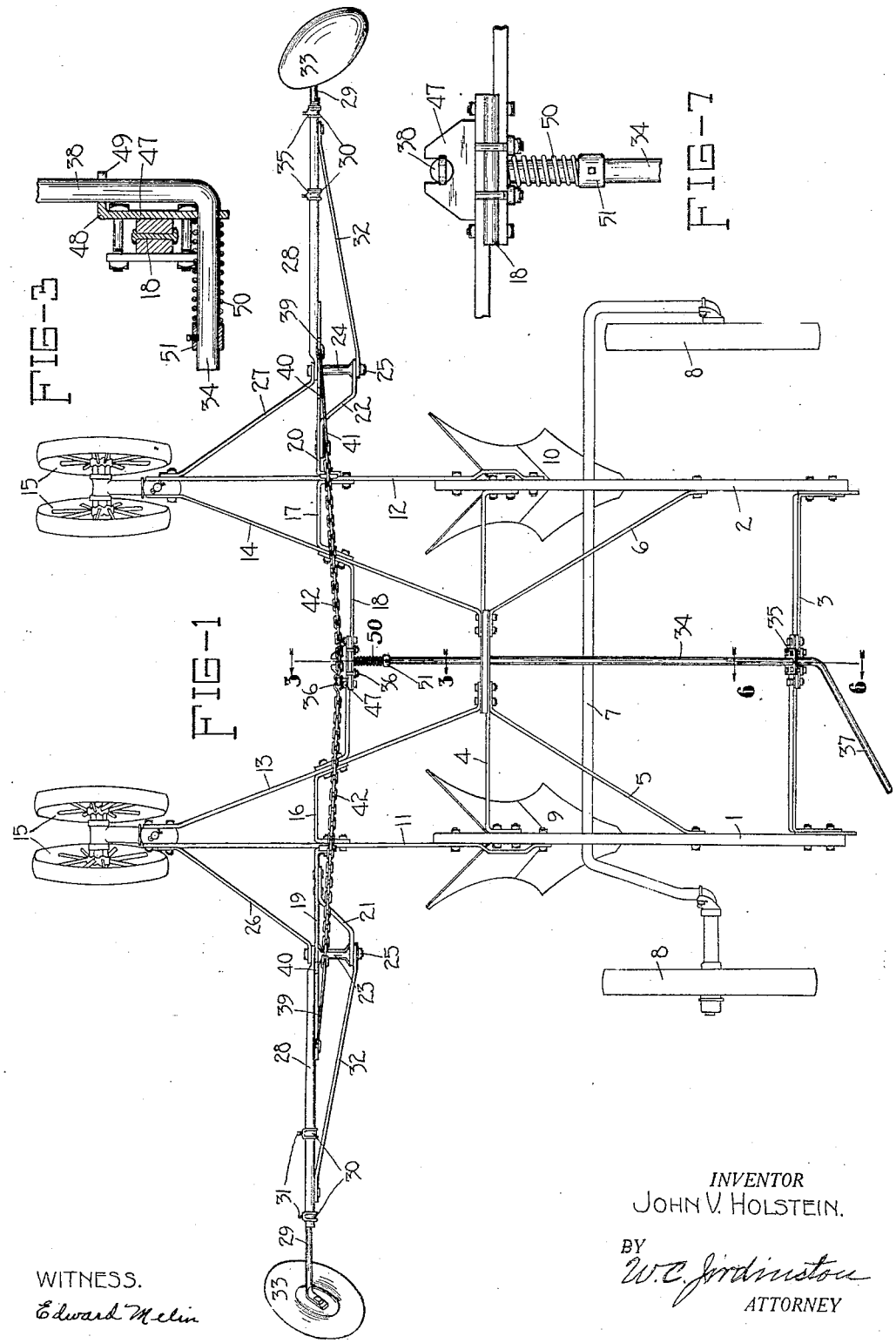

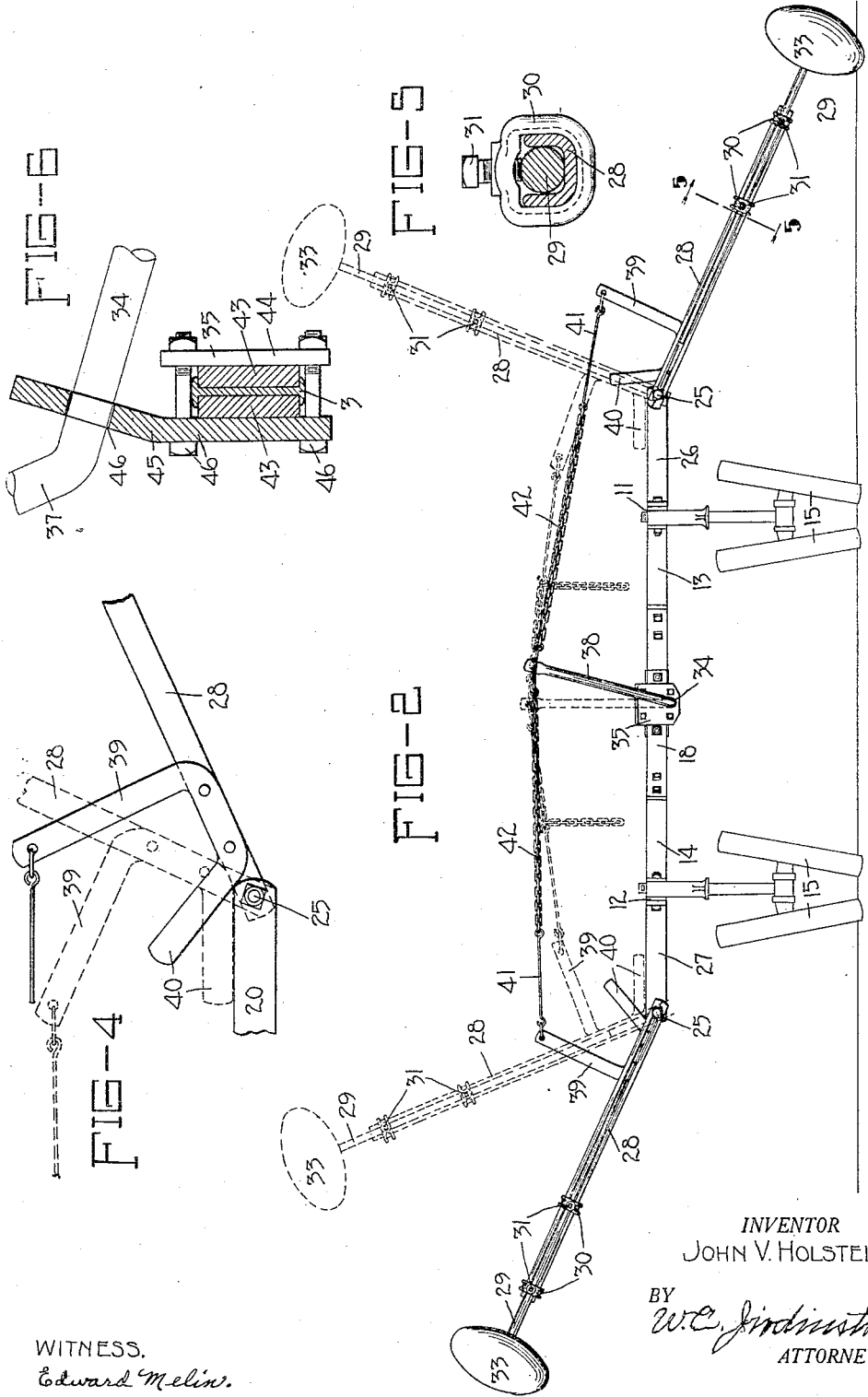

1,888,502

UNITED STATES PATENT OFFICE

JOHN V. HOLSTEIN, OF MOLINE, ILLINOIS, ASSIGNOR TO DEERE & COMPANY, OF MOLINE, ILLINOIS, A CORPORATION OF ILLINOIS

MARKER FOR CORN PLANTERS

Application filed March 4, 1931. Serial No. 519,967.

My invention relates to corn planters and listers and more particularly to markers commonly employed for scoring the ground as a guide for implements of this class; and the object of my invention is to provide a double marker supported on the rear of the implement and controlled by a simple and effective mechanism operative to lower one marker in contact with the ground while the opposite marker is held raised and inoperative.

A further object of my invention is to raise both markers and automatically lock them in inoperative position.

Referring to the drawings in which similar numerals indicate identical parts—

Figure 1 is a plan view showing in light lines a planter and lister frame with my improved markers mounted thereon;

Figure 2 is a rear view of Fig. 1 showing one of the markers raised and the other in operative position;

Figure 3 is an enlarged detail section on the line 3—3 of Figure 1;

Figure 4 is an enlarged detail rear view of the parts at the pivotal point of the markers on the lister planter frame;

Figure 5 is an enlarged detail section on the line 5—5 of Figure 2; and,

Figure 6 is a plan view of Figure 3;

Figure 7 is a plan view of Figure 3.

The main frame consists of parallel side bars 1 and 2 connected forwardly by a transverse bar 3 and rearwardly by a similar bar 4. Diagonally disposed braces 5 and 6 are bolted to the respective side bars and the rearward transverse bar 4. The main frame is supported on an axle 7 on which are journaled wheels 8. A lister plow 9 is mounted on the side bar 1 and a similar plow 10 is mounted on the side bar 2. A supplemental frame is composed of parallel side bars 11 and 12 bolted to the side bars 1 and 2 respectively of the main frame, and extending rearwardly therefrom, and diagonally disposed bars 13 and 14 having their forward ends secured to the rear transverse bar 4, of the main frame, by the bolts which fasten the braces 5 and 6 thereto. Rearwardly the supplemental frame is supported on wheels 15 in a well known manner. The supplemental frame is strengthened by braces 16, and a bar 18 parallel with the bar 4 and bolted to the bars 13 and 14.

The markers are mounted on the supplemental frame in the following manner; bolted to the side bars 11 and 12 respectively, and extending outwardly therefrom, are brackets formed of bars 19 and 20 to which are fastened bars 21 and 22 the outward end portions of which are bent away from the bars 21 and 22 and spaced by spools 23 and 24 and secured thereto by bolts 25. Braces 26 and 27 are secured to the rear end of the side bars 11 and 12 and extend diagonally to the bars 26 and 27 to which they are secured by bolts 25.

Each marker arm consists of a body portion 28 of channel steel in which is supported a bar 29 secured in place by clips 30 having set screws 31 which contact with the bar 29 and hold it rigidly in place. The body portions 28 of the marker arms are pivotally secured to the arms 19 and 20 by the bolts 25. Braces 32 are pivotally attached to the brackets by the bolts 25 and extend toward the outer end of the body portion 28 of the markers and are bolted thereto to reinforce the body portions 28 and counteract the drag force of the marker when in operation. Discs 33 are mounted on the free ends of the bars 29.

A rock shaft 34 is disposed longitudinally and centrally of the machine and is journaled in a support 35 on the transverse bar 3 of the main frame and in a support 36 on the transverse bar 18, so that the rock shaft has a rocking as well as a limited longitudinal movement as will be explained. The forward end of the shaft is bent upwardly to form a lever 37 by operation of which the shaft is rocked. The rear end of the shaft is also bent upwardly as an arm 38 in the end of which is an eye. Riveted or otherwise secured to the body portion 28 of each marker arm is a U-shaped member, vertically disposed, with the outer arm 39 of greater length than the inner arm 40, and to the outer arm 39 is attached a link 41 provided with a hook end to engage with a chain 42 connected to the end of the arm 38 of the rock shaft 34.

The bar 3 is an I-bar and between the flanges on each side thereof are inserted blocks 43 held in place by a plate 44 in front of the bar, and a plate 45 rearward of the bar and secured by bolts 46 passing through both plates above and below the bar. The plate 45 is provided with an opening 46 in which the rock shaft 34 is supported and freely movable. The rearward support 36 of the rock shaft 34 is constructed similarly to the forward support 35 with the exception that the rear plate 47 thereof has a rearwardly extending portion 48 a central notch 49 in which, when both markers are raised, the arm 38 automatically engages and is held therein by a coiled spring 50 on the rock shaft forward of the plate 47 and exerting its expansive force between the plate and a stop 51 on the rock shaft.

The markers are shown in dotted lines in Figure 1 as in position for transportation or storage and are so held by the arm 38 engaging with the notch in the plate 48, the chains 42 having been shortened previously by disconnecting them from the hook ends of the links 41 and again connecting the links to the chains at a desired point. When the markers are to be used the ends of the chains 42 are again connected to the links 41, after which an operator by a rearward thrust of the rock shaft 34 can free the arm 38 from the notch 49 then by operation of the lever 37 the shaft 34 can be rocked to lower the right marker simultaneously raising the left marker, and by rocking the shaft in the opposite direction the positions of the markers will be reversed. If it is desired to hold both markers out of operation the arm 38 will be held in the notch 49 as previously explained. The limit to the rising movement of the markers is fixed by the arms 40 which contact with the bars 19 and 20 as illustrated in Figure 2 in dotted lines.

I do not limit myself to the frame construction shown as the markers and their operative parts can readily be adapted to frames of other types.

What I claim is—

1. In an agricultural implement having a supporting frame, the combination therewith of a shaft disposed longitudinally of the frame and rockably and longitudinally movable in bearings thereon, a vertically extending arm on the rear end of the shaft, marker arms pivotally supported on opposite sides of the frame, means connecting the marker arms with the vertical arm, a lever on the forward end of the shaft operable to rock said shaft and arms, and a locking device on the frame automatically operative to prevent the rocking movement of the shaft.

2. In an agricultural implement having a supporting frame, the combination therewith of a shaft disposed longitudinally of the frame, bearings on the frame in which said shaft is rockably and longitudinally movable, a vertically extending arm on the rear end of the shaft, marker arms pivotally supported on opposite sides of the frame, flexible means connecting the marker arms to the vertical arm, a lever on the forward end of the shaft operable to rock said shaft and arm to lower and raise the marker arms, and a locking device on the frame automatically operative to engage said arm and hold said shaft and arm inoperative, said arm releasable from said device by longitudinal movement of the shaft.

3. In an agricultural implement having a supporting frame, the combination therewith of a shaft disposed longitudinally of the frame and rockably and longitudinally movable, bearings on the frame in which the shaft is journaled, a vertically extending arm on the rear end of the shaft, marker arms pivotally mounted on opposite sides of the frame, flexible means connecting the marker arms with the vertical arm, a lever on the forward end of the shaft operable to rock said shaft and arm to lower and raise the marker arms, a locking device on the frame automatically operative to engage said arm and hold said shaft and arm inoperative, said arm releasable from said device by longitudinal movement of the shaft, and means to normally hold the shaft from rearward longitudinal movement.

4. In an agricultural implement having a supporting frame, the combination therewith of a shaft disposed longitudinally of the frame, bearings on the frame in which said shaft is journaled and rockably and longitudinally movable therein, a vertically extending arm on the rear end of the shaft, marker arms pivotally supported on opposite sides of the frame, means connecting the marker arms with the vertical arm, a lever on the forward end of the shaft operable to rock said shaft and arm to lower and raise the marker arms, and a locking device on the frame with which said arm is adapted to engage to hold the shaft and arm inert, said arm releasable from said lock by a longitudinal movement of the shaft, and means to normally hold the shaft from rearward movement.

5. In an agricultural implement having a supporting frame, the combination therewith of a shaft disposed longitudinally of the frame, bearings on the frame in which said shaft is journaled and rockably and longitudinally movable therein, a vertically extending arm on the rear of said shaft, marker arms pivotally mounted on opposite sides of the frame and connected to said arm, a lever on the forward end of the shaft operable to rock said shaft and lower or raise the marker arms, a locking member on the frame having inclined sides and a central notch, said arm automatically engaging with said notch to hold said arm and shaft inert and releasable therefrom by rearward longitudinal movement of the shaft.

6. In an agricultural implement having a supporting frame, the combination therewith of a shaft disposed longitudinally of the frame, bearings on the frame in which said shaft is journaled and rockably and longitudinally movable therein, a lever on the forward end of the shaft, a vertically extending arm on the rear of the shaft, marker arms pivotally mounted on opposite sides of the frame and connected to said arm and lowered or raised by operation of the lever to rock said shaft and arm, a locking member on a transverse bar of the frame and having inclined sides and a central notch, the arm automatically engaging with said notch to hold the shaft and arm inert, and a coiled spring on the shaft between the rear bearing and a stop on the shaft.

7. In an agricultural implement having a supporting frame comprising two laterally spaced longitudinally positioned beams carrying furrow openers, a transversely extending spacing member connecting the forward ends of the beams, a wheel supported frame structure extending rearwardly from each beam, and a transversely extending brace connecting said frame structures, the combination therewith of a longitudinally disposed shaft rockably supported on said member and said brace, a vertically extending arm on the rear end of said shaft, a marker arm pivotally mounted on one of said frame structures, means connecting said arms, and means on the forward end of said shaft operable to rock said shaft to lower and raise the marker arm.

8. In an agricultural implement having a supporting frame, the combination therewith of a pair of longitudinally aligned bearings on the frame, a shaft rockably and longitudinally mounted in said bearings, a vertically extending arm on one end of said shaft, a marker arm pivotally mounted on said frame, means connecting said arms, one of said bearings comprising a vertically disposed plate having a perforation in its lower end through which said shaft extends and having a lateral extending flange on its upper end provided with a notch for receiving the vertically extending arm of said shaft, a collar fixed to said shaft adjacent said plate, and a compression spring embracing said shaft and bearing against said collar and said plate to normally maintain the vertical arm on said shaft in said notch.

9. In an agricultural implement having a supporting frame comprising two laterally spaced longitudinally positioned beams carrying furrow openers, a transversely extending spacing member connecting the forward ends of the beams, a wheel supported frame structure extending rearwardly from each beam, and a transversely extending brace connecting said frame structures, the combination therewith of a longitudinally disposed shaft rockably supported on said member and said brace, a vertically extending arm on the rear end of said shaft, a marker arm pivotally mounted on one of said frame structures, an arm extending vertically and rigidly secured to the marker arm, means connecting said arms, means connecting said vertical arm with the vertical arm on the shaft, means on the forward end of said shaft operable to rock said shaft to lower and raise the marker arm, and a shorter arm rigidly secured to the marker arm adjacent the pivot thereof and contacting with the frame structure to limit the rising movement of the marker arm.

10. In an agricultural implement having a supporting frame comprising two laterally spaced longitudinally positioned beams carrying furrow openers, a transversely extending spacing member connecting the forward ends of the beams, a wheel supported frame structure extending rearwardly from each beam, and a transversely extending brace connecting said frame structures, the combination therewith of a longitudinally disposed shaft rockably supported on said member and said brace, a vertically extending arm on the rear end of said shaft, a marker arm pivotally mounted on one of said frame structures, a U-shaped member rigidly and vertically secured on the marker arm adjacent the pivot thereof, the outer arm of said member of greater length than the inner arm thereof, means connecting the outer arm with the vertical arm on the shaft, and means on the forward end of said shaft operable to rock said shaft to lower and raise the marker arm, the inner arm of said member operating to contact with the frame structure and limit the rising movement of the rocker arm.

JOHN V. HOLSTEIN.